H. AUSTIN.
SPRING FOR VEHICLES.
APPLICATION FILED APR. 14, 1909.
1,025,233.
Patented May 7, 1912.
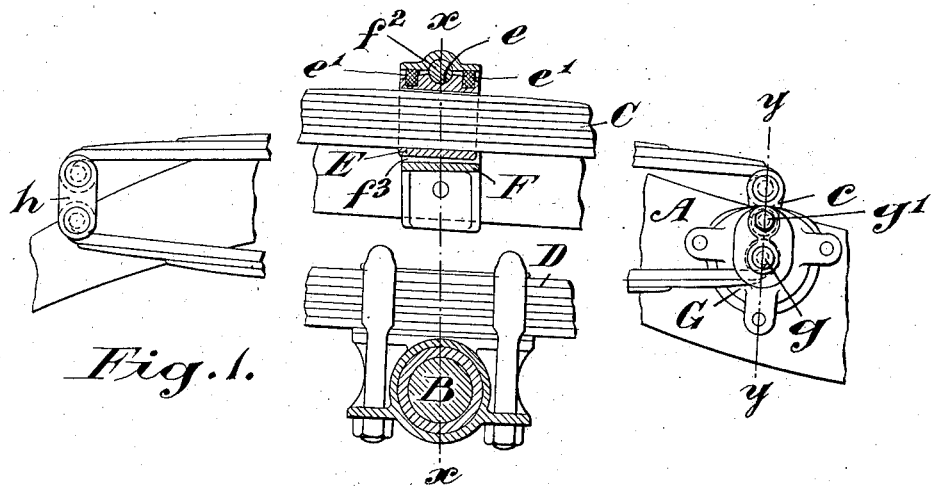
Fig. 1.
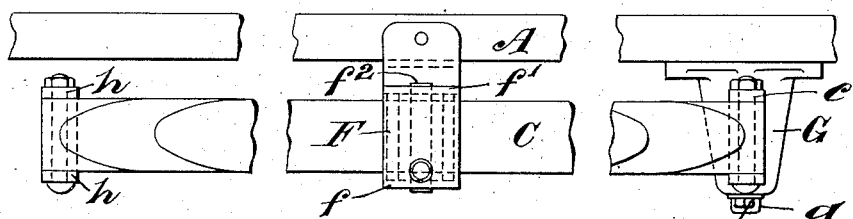
Fig. 2.
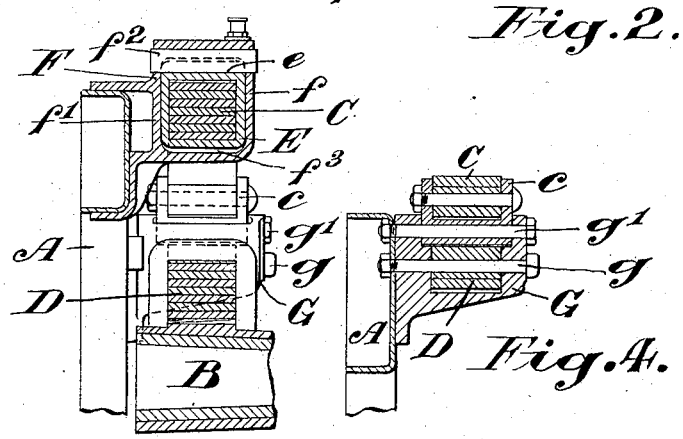
Fig. 3.
Fig. 4.
Witnesses:
E. L. Brown.
Anthony F. Arcome.
Inventor:
Herbert Austin
By Edmond Conger Brown,
Attorney.
COLUMBIA PLANOGRAPH CO., WASHINGTON, D. C.

UNITED STATES PATENT OFFICE.

HERBERT AUSTIN, OF BARNT GREEN, NEAR BIRMINGHAM, ENGLAND.

SPRING FOR VEHICLES.

1,025,233. Specification of Letters Patent. Patented May 7, 1912.

Application filed April 14, 1909. Serial No. 489,780.

*To all whom it may concern:*

Be it known that I, HERBERT AUSTIN, a subject of the King of Great Britain, residing at Barnt Green, near Birmingham, in the county of Warwick, England, engineer, have invented certain new and useful Improvements in Springs for Vehicles, of which the following is a specification.

The general or main object of this invention is the provision of a spring, more especially for the axle of a driven wheel of an automobile, which shall combine great flexibility with short periodicity, with greatly reduced liability to yield sidewise.

The type of spring to which the invention applies is that known as "double elliptic." In this type of spring, as usually heretofore employed with an automobile, the ends of the oppositely curved main members of the spring are pivoted together by a single pivot at each end, the lower main member is connected at its middle direct with the axle, and the upper main member is connected at its middle with the frame, and the axle is connected with the frame by a radius rod. These being the only connections between the spring and the frame, the spring is unstable sidewise, and the frame is very liable to sway.

Now, according to the main features of this invention as broadly described, the extremities of the two main members at one end of the spring are pivotally connected, either one of them directly and the other through a short link, or each of them through a separate link, with the frame, whereby the spring is well supported sidewise by the frame, and the extremities of the members at the other end of the spring are connected together by a short link, and the middle of the upper member is pivotally connected with the frame.

If the extremities at one end of the two main members are pivoted to the frame, the lower direct thereto and the other by means of a link, radius rods are not used. If such extremities are each of them pivoted to the frame by means of a separate link, radius rods are required; and radius rods are used also if, as in a modification, such extremities are simply pivoted to the upper and lower ends, respectively, of a link the middle of which passes through a guide of the frame in a manner which insures that the link will be supported sidewise but be free to move endwise of the frame and also vertically, and in this case the upper member may be fixed at its middle in relation to the frame. This modification may itself be modified by dispensing with the link at either or both ends of the spring and pivoting the ends of the main members of the spring together at either or both ends of the spring, in which case the pivoted joint or the link or one of the pivoted joints between the two main members may come inside a guard which is rigid with the frame and be thus securely held from moving outward from the frame, the spring being free however to move endwise and vertically within such guard; and the upper member may also in this case be fixed at the middle in relation to the frame.

The lower main member of the spring is connected with the axle in the usual or any convenient manner, to suit a fixed or turning axle as the case may be. When one of the main members is pivoted direct at one end to the frame, and also when both such members are linked to the frame at one end of the spring, the upper main member is pivotally connected at its middle with the frame, being conveniently carried in a box, bridle, or the like, which is itself carried by a bracket from the frame, and the box is capable of rocking about a horizontal pivot axis of the bracket. A convenient form of the connection between the box and the bracket is to place the box between an inner and outer wall of the bracket and to fit a substantially semi-circular bearing at the top of the box against the under surface of a pivot pin which is carried by the bracket.

It will be observed that, even in the cases in which a member of the spring is pivoted at one end direct to the frame, or both members are linked at their corresponding ends to the frame, the construction of the entire spring admits of the link which joins together as aforesaid the extremities of the main members at the other end of the spring, being quite short, as the movements of the lower main member of the spring, and of the half of the upper main member of the spring which lies in the direction of that end of the lower main member with which it is connected by means of the said link, will not bring the pivot axes of such link's connections with the ends substantially or inconveniently out of vertical line with one another. When the two main members of a spring are linked to the frame at one end of the spring, they may if desired be pivoted direct to one another at the other end of the spring.

The invention is applicable, also, as will be understood, to springs of other road vehicles, radius rods being required in such cases also except when an extremity of one member of each of a pair of springs is pivoted direct to the frame or corresponding portion of the vehicle. In lieu of radius rods, vertical guides may be provided to keep the axle in place endwise of the frame while permitting vertical movements thereof.

The linking of the two main members together at one or both ends of the spring, and whether the linking at one of such ends is by means of links (or a link) which connect the members (or one of them) with the frame, or not, affords the advantage that if one of the members has a tendency to elongate more than the other under a given shock, it is free to do so and irregular bendings causing undue strains of the spring are avoided or minimized.

In order that the invention may be clearly understood, I will now describe convenient practical applications of the same, by reference to the drawings herewith, of which:—

Figure 1 is a side elevation of a spring, mounted as used according to a generally preferred form of this invention in supporting a motor car frame upon an axle, that is to say, in the particular instance given, upon a live axle. Portions of the spring are broken away, for convenience of illustration. Fig. 2 is a plan view of the arrangement shown by Fig. 1. Fig. 3 is a section taken on line $x\ x$ of Fig. 1. Fig. 4 is a section taken on line $y\ y$ of Fig. 1.

Referring to the arrangement shown by Figs. 1 to 4 inclusive; A is the rear portion of the side frame of the car, B the axle, C the upper main member of the spring, and D the lower main member thereof. The member D is connected at its middle with the axle in the usual manner, as will be well understood. The member C is fixed at its middle within a box E. The box E fits easily sidewise between the front and back plates $f\ f^1$ of a box-shaped bracket F which is itself bolted rigidly to the frame A. The box E has a bearing $e$, which is conveniently somewhat less than a semicircle, formed in its upper end, which beds up against the underside of a pin $f^2$ which is carried by the bracket, and clearance $f^3$ is left between the underside of the box E and the bottom of the inside of the bracket to allow the box to vibrate about the axis of the pin $f^2$. With a view to prevent dust getting to the bearing $e$, pads $e^1$ of felt or the like are inserted into recesses formed in the upper end of the box E at opposite sides of the vertical axis of the pin $f^2$, which press up against the underside of the upper end of the box portion of the bracket F. One of the extremities of the member D of the spring is pivoted direct, by the pivot pin or stud $g$, to a bracket G which is bolted rigidly to the frame, and the corresponding extremity of the member C is connected, by means of a link $c$, with a pivot pin or stud $g^1$ of the bracket G. The other extremities of the members C and D are coupled together by a short double link $h$. If, as may be the case, the one extremity of the member D is also connected with the frame through the medium of a link, such as in the manner of the corresponding extremity of the member C, a radius rod (or guides) will be required. As will be obvious, a common pivot pin for the member D and the link $c$ may be used in place of the separate pins $g$ and $g^1$.

Having thus described my invention, I claim:—

1. An elliptic spring for vehicles, comprising an upper main member, a lower main member, a link connecting one end of one of the main members to the vehicle and permitting endwise movement of such end in relation to the vehicle, means for pivotally attaching the corresponding end of the other main member directly to the vehicle, a link connecting together the other ends of said members, and means for directly pivotally connecting the middle of the upper main member to the vehicle.

2. An elliptic spring for vehicles, comprising an upper main member, a lower main member, means for pivotally linking one end of one of the main members to the vehicle, means for pivotally attaching the corresponding end of the other main member directly to the vehicle, means for pivotally linking together the other ends of said members, and means for directly pivotally connecting the middle of the upper main member to the vehicle.

3. An elliptic spring for vehicles, comprising an upper main member C, mounted at its middle to rock about a pin $f^2$ of which the axis is rigid with the vehicle, a link $c$ connecting one end of said member with the vehicle, a lower main member D, a pivot pin $g$ directly pivotally connecting with the vehicle the end of such member which corresponds with said end of the upper member, and a link $h$ connecting together the other ends of said members.

4. An elliptic spring for vehicles, comprising an upper main member C, a box E within which the member C is fixed, a bracket F within which the box E just fits easily sidewise, a pivot pin $f^2$ which has its axis rigid with the vehicle, a bearing $e$ in the upper end of the box, which bears against the underside of the pin and allows the box to rock under the movements of the member C, a lower main member D, means by which the two main members are pivotally connected at one end to the vehicle one of them directly and the other by a link and are pivotally connected together at their other ends.

5. An elliptic spring for vehicles, comprising an upper member C, a box E, a bracket F, a pin $f^2$, a bearing $e$ in the upper end of the box, a link $c$ pivotally connecting one end of the member C with the vehicle, a lower member D, a pin $g$ pivotally connecting such member directly with the vehicle, and a link $h$ connecting together the other ends of said members, substantially as set forth.

In witness whereof I have hereunto signed my name this 29th day of March 1909, in the presence of two subscribing witnesses.

HERBERT AUSTIN.

Witnesses:
ERNEST PARKER,
ROBERT G. GROVES.

Copies of this patent may be obtained for five cents each, by addressing the "Commissioner of Patents, Washington, D. C."